Figure 1:
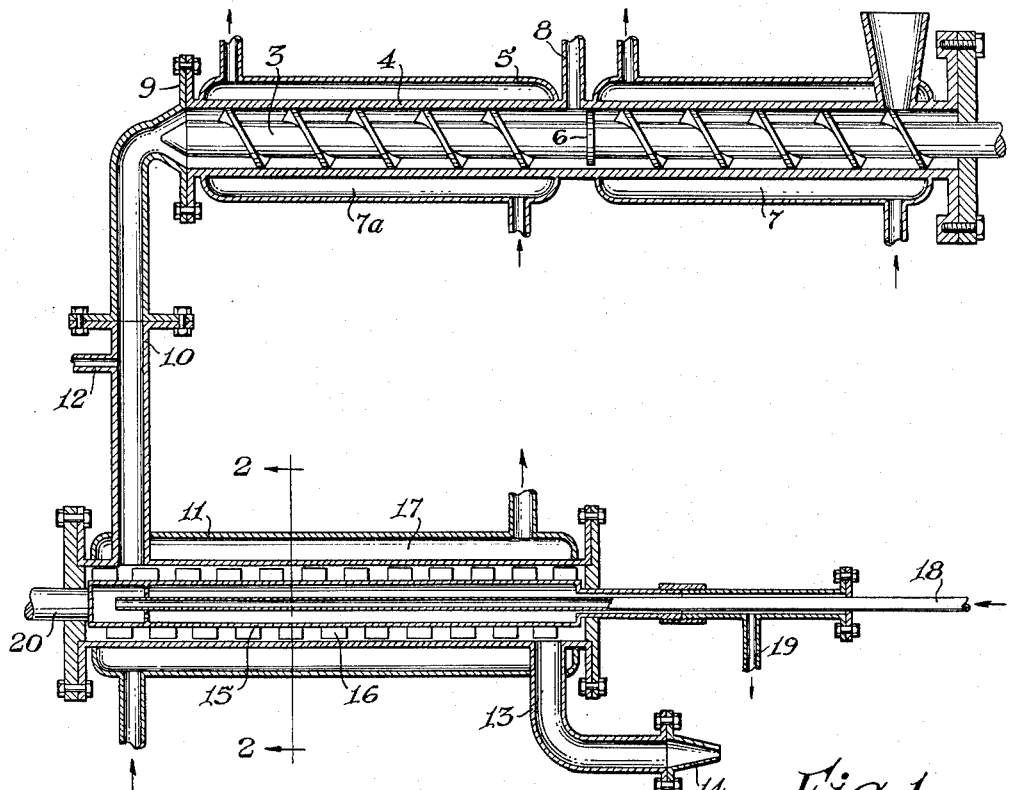

Feb. 23, 1954  J. L. McCURDY ET AL  2,669,751
PROCESS FOR PRODUCTION OF CELLULAR THERMOPLASTIC PRODUCTS
Filed June 29, 1950

INVENTORS.
John Lloyd McCurdy
BY Chancey Edward DeLong

Griswold & Burdick
ATTORNEYS

Patented Feb. 23, 1954

2,669,751

UNITED STATES PATENT OFFICE 2,669,751

PROCESS FOR PRODUCTION OF CELLULAR THERMOPLASTIC PRODUCTS

John Lloyd McCurdy, Midland, and Chancey Edward De Long, Freeland, Mich., assignors to The Dow Chemical Company, Midland, Mich., a corporation of Delaware Application June 29, 1950, Serial No. 171,148

7 Claims. (Cl. 18—47.5)

This invention concerns an improved process for the manufacture of cellular thermoplastic products. It relates more particularly to the production of such products in the form of substantially uniform cellular bodies in continuous manner from the thermoplastic benzene-soluble polymers and copolymers of monovinyl aromatic compounds having the vinyl radical directly attached to a carbon atom of the aromatic nucleus, particularly polystyrene.

McIntire in United States Patent 2,450,436 has disclosed a method for the preparation of cellular thermoplastic products which involves maintaining a solid thermoplastic resin, e. g. polystyrene, and a normally gaseous agent such as methyl chloride, methyl ether, propylene or butylene, in a closed vessel under pressure at a temperature below the critical temperature of the normally gaseous agent until a homogeneous mobile gel is obtained and thereafter opening an outlet to permit flow of the gel from the vessel. During flow of the mobile gel from the pressurized vessel into a zone of lower pressure, the resin is swollen by vaporization and expansion of the dissolved volatile substance to form a stable cellular product consisting for the most part of individually-closed thin-walled cells.

A method of forming under pressure, a mixture of a predetermined proportion of a normally gaseous agent and a thermoplastic resin and storing the mixture by feeding the same into a pressurized storage vessel wherein it is maintained at a desired temperature until a homogeneous mobile gel or solution is obtained, prior to extrusion and expansion of the resin, as just mentioned, is described in application Serial No. 784,618, filed November 7, 1947, by O. R. McIntire, now Patent No. 2,515,250.

The method heretofore proposed for the manufacture of cellular thermoplastic products by batchwise flow of a mobile gel of a normally gaseous agent and a thermoplastic resin under pressure from a closed vessel into a zone of lower pressure, is less flexible in operation than is desired for many purposes. For instance, the operations of dissolving, under pressure in a closed vessel, a predetermined proportion of a normally gaseous agent in a thermoplastic polymer at a temperature suitable for the extrusion, or of forming the gel at a different temperature and thereafter bringing it to said temperature, are difficult and time-consuming, e. g. it frequently takes from three days to a week in order to carry out these operations. Also, during extrusion of the resultant gel the latter tends to cling to inner walls of the vessel and funnel downward so that vapors escape through the bottom discharge valve when a large amount, e. g. one-third or more of the gel remains in the vessel. A portion of the remaining gel can be discharged satisfactorily by immediately closing the extrusion valve when gas escapes, letting the system stand to permit drainage of gel from inner walls of the vessel and again opening the valve. However, care must be observed during the extrusion and also during recharging of the vessel that the vapor pressure inside the vessel does not decrease sufficiently to permit appreciable expansion to a cellular mass of the gel remaining in the vessel. If these precautions are not observed, extra steps for removal of the cellular material may be required in order to permit satisfactory re-employment of the vessel in the process.

Also, the use of a storage vessel, or other device, e. g. a heat exchanger, to condition or age a mixture, or body, of a normally gaseous agent and a thermoplastic polymer so as to obtain a homogeneous mobile gel having a uniform temperature throughout its mass, prior to extrusion of the same to form a cellular product, does not allow as great a flexibility in the operation of the process as is desired, particularly with regard to rapidly effecting changes in the composition, or the temperature, of the solution being expanded to form the cellular product.

It will be evident from the foregoing that manufacture of the cellular masses would be simplified and rendered less time-consuming and less costly by provision of a method for rapidly blending under pressure and bringing to a desired temperature in continuous manner, a plastic mix to form a homogeneous mobile gel or solution of a predetermined proportion of a normally gaseous agent in a thermoplastic polymer and extruding the gel into a zone of lower pressure as it is formed. It is an object of the invention to provide such a method, and also an apparatus permitting practice of the method in a continuous manner which avoids the need of storing or otherwise pre-conditioning the solution or gel for prolonged periods of time, prior to extrusion of the same and expansion of the polymer to form a cellular mass. Another object is to provide a method for rapidly blending under pressure a plastic mix of a normally gaseous agent and a thermoplastic polymer to a state of homogeneity and bringing the mixture to a desired temperature in continuous manner. Still another object is to provide a method for producing a substantially homogeneous mobile gel or solution of a predetermined proportion of a normally gaseous agent in a thermoplastic polymer under pressure and for expansion of the gel as it is formed to produce a uniform cellular mass of the polymer. Other and related objects will become apparent from the following description of the invention.

According to the invention a cellular thermoplastic product composed for the most part of individually-closed, thin-walled cells of substantially uniform size, can readily be prepared in continuous manner by forming a homogeneous mobile gel or solution of a normally gaseous agent in a thermoplastic polymer under pressure, which gel or solution is rapidly brought to a substantially uniform composition and temperature throughout its mass at the point of extrusion, and thereafter extruding the mobile gel or solution through a constricted passageway, e. g. an extrusion die or orifice, into a zone of lower pressure as it is formed.

It has been found that a homogeneous mobile gel or solution of a normally gaseous agent in a thermoplastic polymer, which gel or solution has a substantially uniform temperature and composition throughout its mass at the point of extrusion, can readily be obtained by feeding a thermoplastic polymer, e. g. polystyrene, in a heat-plastified, or molten, condition, preferably the latter, and a normally gaseous agent such as methyl chloride, methyl ether, propylene, or butylene, into admixture with each other under pressure in a mixing and cooling zone, wherein the mixture is caused to flow through said zone by pressure of the materials fed thereto, agitating the mixture under pressure transversely to the direction of flow thereof through said zone to intimately blend the normally gaseous agent with the polymer while bringing the mixture to a uniform temperature at which it remains flowable and below the boiling point of the normally gaseous agent at the pressure thus applied to the mixture. The mobile gel or solution in a state of homogeneity is expanded as it is formed by extruding or discharging the same from the mixing and cooling zone through a constricted passageway such as an extrusion die or orifice into a zone of lower pressure, e. g. into the atmosphere.

Figure 2:
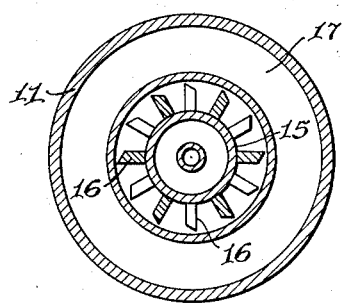

The invention will be illustrated with reference to the accompanying drawing, partly in section, showing one of the various forms of apparatus which may be used in practicing the invention, wherein Fig. 1 is a longitudinal section through the barrel of a plastics extruder in combination with a mixing and cooling device and an extrusion die or orifice; and Fig. 2 is a cross-sectional view of the mixing and cooling device taken along the line 2—2 of Fig. 1.

In the drawing, the numeral 3 designates a feed screw of the compression type in the cylindrical barrel 4 of a horizontal plastics extrusion machine 5. Screw 3 usually has a perforated sealing plate, or ring 6, on a mid-section of the screw, suitably from one-half to three-quarters of the distance from the feed hopper to the discharge end of the screw. Such sealing plate or ring is usually an integral part of the screw 3. Sealing plate or ring 6 is suitably an annular enlargement of the body of the screw 3, of a diameter enough smaller than the bore of the barrel 4 to leave a clearance of from 0.125 to 0.25 inch between the two members, or it may consist of a perforated plate secured to the screw 3 and containing a number of drill holes of from 0.125 to 0.375 inch diameter, in which case a clearance of from 0.010 to 0.020 inch between the bore of the barrel 4 and the rim of the sealing plate 6, is satisfactory. The barrel 4 is surrounded by chambers 7 and 7a for heating or cooling, as required. Beyond sealing plate 6 on the screw 3 is an inlet 8 into the barrel 4 of the extruder. Head 9 is secured to the body of the extruder 5 as shown. Head 9 is also connected to an inlet 10 at one end of a horizontal pressure resistant cylindrical mixing and cooling vessel 11. The vessel 11 is provided with inlets 10 and 12 and outlet 13, which latter has attached thereto extrusion die 14. A hollow roll 15 of a diameter enough smaller than the bore of the cylindrical vessel 11 to leave a clearance of from 0.25 to 0.75 inch or more, between the two members is rotatably mounted within the vessel 11 with running clearance between the ends of the roll and the ends of the vessel 11. The roll 15 suitably has a number of lugs or projections 16 secured to its outer surface and adapted to leave a clearance of from 0.010 to 0.020 inch between their ends and the bore of the mixing and cooling chamber 11. The vessel 11 is surrounded by chamber 17 for heating or cooling as required. The hollow roll 15 is provided with inlet 18 and outlet 19 for passing heating or cooling fluid into contact with inner surfaces of the roll 15, as required. Roll 15 is driven by any usual means such as an electric motor and variable speed drive (not shown) connected to shaft 20.

The essential feature of the invention is the uniform blending and transfer of heat throughout a mixture of a heat-plastified or molten thermoplastic polymer and a normally gaseous agent under pressure, which occurs in the mixing and cooling vessel to produce rapidly a homogeneous mobile gel or solution having a substantially uniform temperature and composition throughout its mass at the point of extrusion. Prior to extrusion from the vessel, the mixture is brought to a temperature such that the normally gaseous agent is in non-gaseous form at the applied pressure.

It may be mentioned that agitation of the pressurized mixture of the thermoplastic polymer and a normally gaseous agent in a direction transverse to the flow of the mixture through the mixing and cooling vessel has an effect of adding heat to the mixture by transfer of a part of the mechanical energy employed to drive the roll into heat energy by the shearing action on the gel or solution. Accordingly, agitation of the mixture to an extreme degree may result in a rise in temperature of the gel or solution, i. e. heat may be added to the mixture by mechanical agitation faster than it can be removed by transfer through surfaces in contact therewith and in contact with a cooling medium. In general, a degree of stirring or agitation transverse to the direction of flow of the mixture through the mixing and cooling zone sufficient to prevent channeling through said zone, or to avoid uneven distribution of the normally gaseous agent throughout the mass of the mixture, is satisfactory. The degree of agitation required to blend the mixture to a homogeneous solution while bringing the same to the desired temperature throughout its mass at the point of extrusion will, of course, vary widely, depending upon the dimensions and the shape of the apparatus used.

The normally gaseous agent to be employed in the process for forming the cellular product should be a substance which is soluble in, or at least appreciably soluble in, the polymer under an applied pressure of several atmospheres. Said agent is one which is gaseous at room temperature and atmospheric pressure. Examples of substances which are suitable in forming the cellular thermoplastic products are methyl chloride, methyl ether, ethyl chloride, dichlorodifluoromethane, and normally gaseous olefines such as propylene or butylene. Mixtures of any two or more of the above compounds may also be used.

The amount of the normally gaseous agent dissolved in the polymer in forming the cellular product should be such that upon release of the pressure it is vaporized almost completely, causing not only swelling and expansion of the polymer to form the cellular product, but at the same time cool it to a temperature such that it is dimensionally stable. When the thermoplastic polymer is polystyrene and the gel prior to release of the pressure is at a temperature above 85° C., an amount of the normally gaseous agent sufficient to expand and cool the polymer to a temperature of 85° C., or lower, is employed. The normally gaseous agent is usually employed in amount corresponding to form 0.05 to 0.25 part, preferably from 0.05 to 0.20 part, by weight per part of the thermoplastic polymer used, i. e. in amount corresponding to from 5 to 25 per cent based on the weight of the polymer.

In most instances, the polymer in a heat-plastified, or molten state, is fed under pressure at a temperature between 120° and 220° C., preferably a temperature of from 160° to 200° C., into admixture with the normally gaseous agent, in the desired proportions, at superatmospheric pressure in the mixing and cooling zone or vessel. The resulting plastic mixture is blended under pressure and is brought to a temperature such that the normally gaseous agent is in non-gaseous form at the pressure thus applied to the mixture. The pressure to be employed may vary from about 300 pounds per square inch up to the limits of the apparatus, but a pressure of from 400 to 2000 pounds per square inch is preferred. In general, a pressure corresponding to the vapor pressure of the normally gaseous agent at the temperature of the gel just prior to extrusion, is satisfactory, although best results are obtained when somewhat higher pressures are employed.

The solution or gel is formed under pressure and is brought to a temperature below the critical temperature of the normally gaseous agent used, which in the case of methyl chloride is about 143° C. The gel is suitably brought to a temperature within the range of from 60° to 130° C., preferably from 90° to 110° C., just prior to release of the pressure by extrusion of the gel into a zone of lower pressure.

In producing a cellular thermoplastic product by the present method, the heat-plastified, or molten, polymer is fed under pressure by means of the plastics extruder 5, or in other usual manner, e. g. by means of a plastics gear pump, into the mixing and cooling device 11 via inlet 10. A normally gaseous agent capable of being dissolved by the polymer is suitably introduced via inlet 12 or inlet 8 at superatmospheric pressure, in the desired proportion. The mixture flows through the annular passageway between the barrel of the vessel 11 and the roll 15, by pressure of the screw on the feed materials entering admixture with each other. The mixture is agitated transversely to the flow thereof by the rotating roll 15 and its projecting lugs 16 which rapidly and uniformly blends the plastic mixture to a homogeneous composition. Simultaneously with the blending operation, the mixture is brought to a desired temperature at which it remains flowable and such that the normally gaseous agent is in non-gaseous form at the pressure thus applied to the mixture by passing a cooling medium, e. g. water, through chamber 17 and roll 15, and forms a mobile gel or solution having a substantially uniform composition and temperature throughout its cross-section or mass at the point of extrusion. The mobile gel or solution is discharged or flows from vessel 11 as it is formed through outlet 13 and extrusion die or orifice 14 into a zone of lower pressure, e. g. into the atmosphere, and swells or expands by vaporization of the normally gaseous agent to form a cellular mass of the polymer.

It is important that the gel be blended to a homogeneous composition and a substantially uniform temperature throughout its mass, just prior to release of the pressure, in order to obtain a cellular product composed of individual cells of substantially the same size. It may be mentioned that the size of the cells formed in the cellular product and also the bulk density of the latter may be varied at will by varying the temperature of the gel and its content of the dissolved volatile agent throughout its mass at the point of extrusion. In general, an increase in such temperature causes a decrease in the bulk density of the product formed upon release of the pressure for a given proportion of the dissolved volatile agent.

The pressure maintained on the mixture may be varied at will by varying the size of the extrusion die, or the length of the orifice, through which the mobile gel is discharged from the mixing and cooling vessel, or by changing the rates of feed of the normally gaseous agent and the polymer to the vessel. It may be mentioned that in general the mobile gel discharged from the vessel is a more readily flowable composition than is the heat-plastified or molten polymer fed into the vessel. Accordingly, an extrusion die or orifice having a cross-sectional area considerably less than the cross-sectional area of the feed inlet to the vessel is usually employed in order to maintain the mixture under the desired pressure during the blending and cooling operation. Also, for an extrusion die having a passageway of a given cross-sectional area, there is a minimum rate of feed of the polymer and the normally gaseous agent to the vessel which is required in order to obtain a desired pressure on the mixture. Although the pressure maintained on the mixture in the mixing and cooling vessel is dependent to a lesser degree upon variable conditions such as the kind and proportion of the normally gaseous agent dissolved in the polymer and the temperature prior to extrusion or release of the pressure on the gel, the pressure can readily be controlled by regulating the relative rates of feed of the components into the vessel and discharge of the mobile gel therefrom through a constricted passageway or an extrusion die as just mentioned. The process permits ready change in the proportions of the normally gaseous agent and the polymer and also in the temperature and pressure employed. The method permits the production of cellular thermoplastic products composed principally of individually-closed thin-walled cells of substantially uniform size in continuous manner.

The following examples illustrate ways in which the principle of the invention has been applied, but are not to be construed as limiting the invention:

*Example 1*

An arrangement of apparatus consisting of a plastics extruder, having a bore of 3.5 inches and a barrel four feet long surrounded by a divided jacket, in combination with a mixing and cooling device similar to that illustrated in the drawing, was employed to prepare a cellular thermoplastic product from polystyrene. The screw of the plastics extruder had a sealing plate integral therewith, 22 inches from the hopper or feed end of the extruder barrel. The sealing plate contained thirty-six 0.125 inch diameter drill holes equally spaced on a 3 inch circle and was of a diameter enough smaller than the bore of the barrel of the extruder to leave a clearance of 0.020 inch between the two members. The plate formed a plastic seal against countercurrent flow of gas through the extruder barrel. Beyond the plate, in the extruder barrel was a 0.5 inch diameter inlet for feed of the normally gaseous agent into admixture with the molten polymer. The discharge head of the plastics extruder was connected to an inlet on the mixing and cooling device by a 2 inch diameter conduit 5 feet long. The mixing and cooling device consisted of a jacketed pressure resistant cylindrical barrel having an internal diameter of 4 inches by 32 inches long, surrounded by a chamber with suitable inlets for passage of a heating or cooling medium therethrough. A cylindrical roll 3.5 inches in diameter was mounted within the barrel, with running clearance between the ends of the barrel of the mixer and cooler and the ends of the roll. On its outer surface the roll had eight rows of one-quarter by one-half inch long, lugs, or projections, adapted to scrape the plastic mixture from the barrel and agitate or mix the same when the roll was rotated. An outlet consisting of a 2 inch diameter by one foot long conduit near the discharge end of the mixer and cooler barrel was connected to an extrusion die containing a circular extrusion orifice having a diameter of 0.45 inch.

A mixture consisting of 100 parts by weight of granular polystyrene, 0.75 of Silene (precipitated calcium silicate) and 0.08 part of barium stearate was fed into the 3.5 inch extruder, from or through the hopper, at a rate of 26.9 pounds per hour, wherein it was compressed by the screw action and was heated to a temperature of 195° C. by passing steam through the surrounding jacket. After being advanced by the screw, beyond the sealing plate in the barrel of the extruder, the heated polymer was mixed with a stream of propylene in amount corresponding to a flow of 1.95 pounds of the propylene per hour. The mixture was cooled as it was advanced by the screw toward the discharge end of the extruder by passing cooling water through the surrounding jacket. The mixture was discharged from the extruder at a temperature of 125° C. and was fed into the mixing and cooling vessel under a pressure of 1100 pounds per square inch. The plastic mixture was advanced, or caused to flow, through the annular passageway between the roll and the barrel of the mixing and cooling vessel by pressure of the screw on the feed materials. The roll was rotated at a speed of 16 revolutions per minute. Cooling water was passed at a temperature of 60° C. into the outer jacket of the mixing and cooling vessel and flowed therefrom at a temperature of 73° C. The mixture was discharged from the mixing and cooling vessel under a pressure of 780 pounds per square inch as a homogeneous mobile gel having a uniform temperature of 102.5° C. throughout its mass at the point of discharge and was extruded through the 0.45 diameter orifice into the atmosphere. The blending time was approximately 15 minutes. By blending time is meant the time required for an infinitestimal portion of the plastic mixture to traverse the mixing and cooling zone wherein it is mechanically agitated by the roll from the point of feed to said zone to the point of discharge. The mobile gel expanded on release of the pressure to form a substantially round cellular log or bar having a diameter of 2.5 inches. The cellular product had a bulk density corresponding to 1.87 pounds per cubic foot.

*Example 2*

By procedure similar to that described in Example 1, the granular polystyrene mixture was fed at a rate of 27.3 pounds per hour into the extruder wherein it was heated to a temperature of 190° C. and was mixed with ethyl chloride in amount corresponding to a flow of 2.46 pounds of the ethyl chloride per hour. The mixture was discharged from the extruder at a temperature of 136° C. and was fed into the mixing and cooling vessel under a pressure of 950 pounds per square inch. The roll was rotated at 16 revolutions per minute. Cooling water at a temperature of 78° C. was passed into the jacket of the vessel and flowed therefrom at a temperature of 85° C. The mixture was discharged from the mixing and cooling vessel under a pressure of 610 pounds per square inch as a homogeneous solution having a uniform temperature of 102° C. throughout its mass at the point of discharge and was extruded through a 0.45 inch diameter nozzle into the atmosphere. The gel expanded to form a uniform cellular billet or rod having a diameter of about 2 inches. The cellular product had a bulk density corresponding to 2.04 pounds per cubic foot.

*Example 3*

The granular polystyrene mixture of Example 1 was fed at a rate of 30 pounds per hour into the extruder described in Example 1, wherein it was heated to a temperature of 191° C. and was mixed with methyl chloride in amount corresponding to a flow of 2.94 pounds of the methyl chloride per hour. The mixture was discharged from the extruder under a pressure of 1050 pounds per square inch and was fed at a temperature of 112.5° C. into the mixing and cooling vessel. The roll was rotated at 16 revolutions per minute. Cooling water was passed at a temperature of 73° C. into the jacket of the vessel and flowed therefrom at a temperature of 77° C. The mixture was discharged from the mixing and cooling vessel under a pressure of 550 pounds as a homogeneous solution having a temperature of 101° C., into the atmosphere through a 0.45 diameter extrusion orifice and expanded to form a cellular product. The product had a bulk density corresponding to 1.65 pounds per cubic foot.

Example 4

The experiment of Example 3 was repeated, by feeding the polystyrene mixture at a rate of 29.6 pounds per hour into admixture with methyl chloride in amount corresponding to a flow of 2.87 pounds of the methyl chloride per hour, except that the roll was rotated at 31 revolutions per minute and the mobile gel was discharged from the mixing and cooling vessel at a temperature of 105° C. through the 0.45 inch diameter orifice into the atmosphere. The cellular product had a bulk density corresponding to 1.38 pounds per cubic foot.

Example 5

The experiment was repeated, except that the roll was rotated at 8 revolutions per minute and the mobile gel was discharged from the mixing and cooling vessel under a pressure of 700 pounds per square inch and at a temperature of 94° C. The cellular product had a bulk density corresponding to 2.10 pounds per cubic foot.

Example 6

By procedure similar to that described in Example 1, the granular polystyrene mixture was fed at a rate of 27.3 pounds per hour into the extruder wherein it was heated to a temperature of 193° C. and was mixed with methyl chloride in amount corresponding to a flow of 1.62 pounds of the methyl chloride per hour. The mixture was discharged from the extruder at a temperature of 141° C. and was fed into the mixing and cooling vessel under a pressure of 1000 pounds per square inch. The roll was rotated at 16 revolutions per minute. Cooling water was passed into the jacket of the mixing and cooling vessel at a temperature of 71.5° C. and flowed therefrom at a temperature of 81° C. The blended mixture flowed from the mixing and cooling vessel under a pressure of 670 pounds, as a uniform solution having a temperature of 102° C., through a 0.45 inch diameter extrusion orifice into the atmosphere as it was formed and expanded to form a cellular product having a diameter of 2.25 inches. The cellular product had a bulk density of 1.86 pounds per cubic foot.

Example 7

The granular polystyrene mixture of Example 1 was fed at a rate of 31.2 pounds per hour into the extruder described in Example 1, wherein it was compressed and heated to a temperature of 198° C. A liquid mixture consisting of 75 per cent by weight of propylene and 25 per cent of methyl chloride was fed at a rate corresponding to a flow of 2.16 pounds of the mixture per hour into admixture with the molten polystyrene under a pressure of 2000 pounds per square inch. The resulting mixture was discharged from the extruder at a temperature of 111° C. and was fed into the mixing and cooling vessel under a pressure of 1750 pounds per square inch. The roll was rotated at 16 revolutions per minute. Cooling water at a temperature of 48° C. was passed into the jacket of the mixing and cooling vessel and flowed therefrom at a temperature of 56° C. The blended mixture flowed from the mixing and cooling vessel under a pressure of 710 pounds per square inch as a uniform solution having a temperature of 101° C. through a 0.45 inch diameter extrusion orifice into the atmosphere and expanded as it was formed to produce a cellular product. The cellular product had a bulk density of 2.09 pounds per cubic foot.

Example 8

By procedure similar to that described in Example 1, the granular polystyrene mixture was fed at a rate of 28.1 pounds per hour into the extruder wherein it was heated to a temperature of 190° C. and was mixed with methyl chloride in amount corresponding to a flow of 3.93 pounds of the methyl chloride per hour. The resulting mixture was discharged from the extruder at a temperature of 113° C. and was fed into the mixing and cooling vessel under a pressure of 600 pounds per square inch. The roll was rotated at 16 revolutions per minute. Cooling water was passed into the jacket of the mixing and cooling vessel at a temperature of 79° C. and flowed therefrom at a temperature of 98° C. The blended mixture flowed from the mixing and cooling vessel under a pressure of 550 pounds, as a uniform solution having a temperature of 102° C., through a 0.45 inch diameter extrusion orifice into the atmosphere as it was formed and expanded to form a cellular product. The cellular product had a bulk density of 1.14 pounds per cubic foot.

Example 9

The granular polystyrene mixture of Example 1 was fed in continuous manner at a rate of 28.1 pounds per hour into the plastics extruder described in Example 1, wherein it was heated to a temperature of 188° C. and was advanced through the barrel of the extruder by the screw. After being advanced by the screw beyond the sealing plate, the molten polymer was mixed with Freon-12 (dichlorodifluoromethane) in amount corresponding to a flow of 6.11 pounds of the dichlorodifluoromethane per hour. The mixture was discharged from the extruder at a temperature of 122° C. and was fed under a pressure of 1100 pounds per square inch into the barrel of the mixing and cooling vessel. The roll was rotated at 16 revolutions per minute. Cooling water at a temperature of 67° C. was passed into the jacket of the mixing and cooling vessel and flowed therefrom at a temperature of 76° C. The blended mixture flowed from the mixing and cooling vessel under a pressure of 700 pounds per square inch as a uniform solution having a temperature of 103° C. and was extruded through a 0.45 inch diameter extrusion orifice into the atmosphere. The solution expanded upon release of the pressure to form a stable cellular rod or bar. The cellular product had a bulk density of 1.66 pounds per cubic foot and was composed for the most part of substantially uniform cells having a diameter of approximately one millimeter.

The method herein disclosed may be applied in producing uniform cellular products from other thermoplastic resins such as the solid polymers of para-chlorostyrene, meta-chlorostyrene, ortho-methylstyrene, meta-methylstyrene, para-methylstyrene, meta-ethylstyrene, ortho-ethylstyrene, para-isopropylstyrene, methyl methacrylate and vinyl acetate and from solid thermoplastic copolymers such as those of styrene and methyl methacrylate, styrene and alpha-methylstyrene, or of vinyl acetate and vinyl chloride. In all instances, it is important that the aforementioned limitations with regard to the proportion of a volatile agent employed in forming a gel of the polymer by agitating under pressure and the temperature and pressure of the gel prior to release of the pressure be observed.

Other modes of applying the principle of the invention may be employed instead of those explained, change being made as regards the steps or compounds herein employed, provided the steps or compounds stated in any of the following claims or the equivalent of such steps or compounds be employed.

We claim:

1. A method of making a cellular thermoplastic article which comprises feeding a heat-plastified thermoplastic polymer at a temperature between 120° and 220° C. and a normally gaseous agent capable of being dissolved by the polymer into admixture with each other under pressure in amounts corresponding to from 0.05 to 0.25 part by weight of the normally gaseous agent per part of the polymer, to a mixing and cooling zone wherein the mixture is caused to flow through said zone solely by pressure of the feed thereto against frictional resistance to flow upon the mass against walls defining said zone, continuously subjecting the mixture to a non-forwarding agitation transverse to the flow thereof through said zone at each of a plurality of closely spaced regions throughout a major portion of the length of the zone in a manner preventing appreciable accumulation of the mixture as a static layer on stationary walls defining said zone, the transverse agitation being sufficient to prevent channeling and to blend the mixture as a substantially uniform composition, while cooling the mixture to a temperature at which it remains flowable and below the boiling point of the normally gaseous agent at the pressure thus applied to the mixture, to form a homogeneous solution having a substantially uniform temperature of from 60° to 130° C. throughout its mass at the point of discharge from said zone and continuously extruding the solution into a zone of sufficiently lower pressure to cause expansion of the extruded material with resultant formation of a cellular plastic body.

2. A method of making a cellular thermoplastic article which comprises feeding a heat-plastified thermoplastic polymer at a temperature between 160° and 200° C. and a normally gaseous agent capable of being dissolved by the polymer into admixture with each other under pressure, in amounts corresponding to from 0.05 to 0.20 part by weight of the normally gaseous agent per part of the polymer, to a mixing and cooling zone wherein the mixture is caused to flow through said zone solely by pressure of the feed thereto against frictional resistance to flow upon the mass against walls defining said zone, continuously subjecting the mixture to a non-forwarding agitation transverse to the flow thereof through said zone at each of a plurality of closely spaced regions throughout a major portion of the length of the zone in a manner preventing appreciable accumulation of the mixture as a static layer on stationary walls defining said zone, the transverse agitation being sufficient to prevent channeling and to blend the mixture as a substantially uniform composition, while cooling the mixture to a temperature at which it remains flowable and below the boiling point of the normally gaseous agent at the pressure thus applied to the mixture, to form a homogeneous solution having a substantially uniform temperature of from 90° to 110° C. throughout its mass at the point of discharge from said zone and continuously extruding the solution into a zone of sufficiently lower pressure to cause expansion of the extruded material with resultant formation of a cellular plastic body.

3. A method as claimed in claim 2 wherein the thermoplastic polymer is a normally solid polystyrene.

4. A method as claimed in claim 3 wherein the normally gaseous agent is methyl chloride.

5. A method as claimed in claim 3 wherein the normally gaseous agent is propylene.

6. A method as claimed in claim 3 wherein the normally gaseous agent is ethyl chloride.

7. A method as claimed in claim 3 wherein the normally gaseous agent is a mixture consisting of methyl chloride and propylene.

JOHN LLOYD McCURDY.
CHANCEY EDWARD DE LONG.

References Cited in the file of this patent
UNITED STATES PATENTS

| Number | Name | Date |
| --- | --- | --- |
| 2,333,786 | Hessen | Nov. 9, 1943 |
| 2,354,260 | Haney et al. | July 25, 1944 |
| 2,450,436 | McIntire | Oct. 5, 1948 |
| 2,515,250 | McIntire | July 18, 1950 |